United States Patent
Hakala

[19]

[11] Patent Number: 6,138,781
[45] Date of Patent: Oct. 31, 2000

[54] SYSTEM FOR GENERATING ELECTRICITY IN A VEHICLE

[76] Inventor: James R. Hakala, 780 Garfield Rd., Auburn, Me. 04210

[21] Appl. No.: 09/118,863

[22] Filed: Jul. 20, 1998

Related U.S. Application Data

[60] Provisional application No. 60/058,911, Aug. 13, 1997.

[51] Int. Cl.[7] ..................................................... B60K 16/00
[52] U.S. Cl. ............................ 180/2.2; 180/65.3; 180/165
[58] Field of Search ............................ 180/2.2, 2.1, 65.1, 180/65.3, 302, 165, 68.1–68.3

[56] References Cited

U.S. PATENT DOCUMENTS

| | | | |
|---|---|---|---|
| 3,556,239 | 1/1971 | Spahn ........................................ | 180/2.2 |
| 3,621,930 | 11/1971 | Dutchak . | |
| 3,878,913 | 4/1975 | Lionts et al. ............................... | 180/2.2 |
| 3,986,575 | 10/1976 | Eggmann ................................. | 180/302 |
| 4,141,425 | 2/1979 | Treat . | |
| 4,168,759 | 9/1979 | Hull . | |
| 4,254,843 | 3/1981 | Han et al. ................................. | 180/2.2 |
| 4,423,368 | 12/1983 | Bussiere . | |
| 5,280,827 | 1/1994 | Taylor et al. . | |
| 5,287,004 | 2/1994 | Finley . | |
| 5,386,146 | 1/1995 | Hickey ..................................... | 180/2.2 |
| 5,460,239 | 10/1995 | Jensen ..................................... | 180/302 |
| 5,584,355 | 12/1996 | Burns ....................................... | 180/165 |
| 5,606,233 | 2/1997 | Davis . | |
| 5,760,515 | 6/1998 | Burns ..................................... | 180/65.3 |
| 5,836,412 | 11/1998 | Lyles et al. ............................. | 180/65.1 |
| 6,009,965 | 1/2000 | Takanohashi et al. ................. | 180/65.3 |

FOREIGN PATENT DOCUMENTS

| | | |
|---|---|---|
| 3139165 | 4/1983 | Germany . |
| 3500141 | 7/1986 | Germany . |
| 4138898 | 6/1993 | Germany . |

*Primary Examiner*—Brian L. Johnson
*Assistant Examiner*—Matthew Luby
*Attorney, Agent, or Firm*—Richard C. Litman

[57] ABSTRACT

A wind-powered system for generating electricity in a vehicle or other power consumption unit generally having a multi-stage impeller system for driving an electric generator/alternator, an improved air channel, and an improved start-up/back-up air compressor. The multi-stage impeller system includes high-speed impellers and low-speed impellers for efficient energy conversion throughout the entire range of a vehicle's operating speeds or forward motion. The improved start-up/back-up air compressor discharges air directly to the multi-stage impellers, abolishing the need for heavy air accumulators. The improved air channel includes a specially formed air scoop/vortex, a wind tube/tunnel and a heating element to increase the velocity of the air passing therethrough.

16 Claims, 4 Drawing Sheets

SYSTEM FOR GENERATING ELECTRICITY IN A VEHICLE

CROSS-REFERENCE TO RELATED APPLICATION

This application claims the benefit of U.S. Provisional Patent Application Ser. No. 60/058,911, filed Aug. 13, 1997.

BACKGROUND OF THE INVENTION

1. Field of the Invention

The present invention relates to a system for generating electricity in an electric vehicle. More particularly, the invention pertains to improvements over existing wind-driven electrical generation systems for vehicles, and especially for automobiles.

2. Description of Related Art

A growing need exists for an automobile designed to operate with a minimal consumption of energy and a nominal impact on the environment. The exigencies created by the shortage of energy supplies and the growing air pollution problem demand a vehicle that can effectively utilize the mechanical energy of the air flow generated by the forward movement of the vehicle. Various systems have been proposed in response to this urgent need. Examples of systems generally related to the present invention include U.S. Pat. No. 3,621,930 issued November 1971 to Dutchak (System of Electricity Generation for Motor-Driven Vehicles); U.S. Pat. No. 4,141,425 issued February 1979 to Treat (Means for Generating Electrical Energy for Vehicle); U.S. Pat. No. 4,168,759 issued September 1979 to Hull (Automobile with Wind Driven Generator); U.S. Pat. No. 4,423,368 issued December 1983 to Bussiere (Turbine Air Battery Charger & Power Unit); U.S. Pat. No. 5,280,827 issued January 1994 to Taylor et al. (Venturi Effect Charging System for Automobile Batteries); U.S. Pat. No. 5,287,004 issued February 1994 to Finley (Automobile Air and Ground Effects Power Package); U.S. Pat. No. 5,606,233 issued February 1997 to Davis (System for Generating Electricity in a Vehicle); German Pat. No. DT 31 39 165 issued April 1983 to Arnold (Auxiliary Charging Device for Battery Driven Vehicle); German Pat. No. DE 35 00 141 A1 issued July 1986 to Fassman (Air Roller and Generating Set for Electric Vehicle); and German Pat. No. DE 41 38 898 A1 issued June 1993 to Gode (Auxiliary Power Source in Motor Vehicle Operated by Air Resistance When Travelling).

Existing wind-powered vehicle systems, generally include the following elements. Air ducts are disposed upon or within a vehicle body. The air ducts are positioned so that air flow generated by the forward movement of the vehicle channels air past rotation of the impellers at least. The rotating impellers drive a generator to produce an electric current. The electric current charges the vehicle's battery which in turn provides the source of energy to activate the electric motor.

Many such wind-powered electricity generating systems are intended for use as the sole power supply for electric cars. Other wind-powered systems are intended to assist other charging sources such as solar collectors, battery chargers for electric cars and alternators for conventionally-fueled vehicles. While the existing systems achieve varying degrees of success, a need exists for improvements in this technology. None of the above inventions and patents, taken either singly or in combination, is seen to describe the instant invention as claimed.

SUMMARY OF THE INVENTION

The present invention includes various improvements over existing wind-powered systems for generating electricity in a vehicle. The improvements include a multi-stage impeller system, an improved means for increasing the velocity of the air entering the multi-stage impeller system and a method for an electric air compressor to initiate the impeller system when all other means fail to charge the battery. These improvements may be employed individually, or in combination. Further, the present wind-powered electricity generation system may be utilized as a sole power supply or as an auxiliary electrical power supply. Moreover, although the system herein described is primarily directed towards use in an automobile, the principles and merits may also be applied to other vehicles and other power consumption units such as vans, trucks, boating vessels, airplanes, and power plants for residences and businesses.

The multi-stage impeller system includes a high-speed impeller designed for maximum efficiency in response to high velocity air flow in combination with a low-speed impeller, also designed for maximum efficiency in response to low velocity air flow. Whereas various units of the existing or conventional wind-powered vehicles employ multiple impellers to drive one or more generators, none disclose the use of multiple impellers designed for maximum efficiency in response to air flows of different velocities.

Use of a multi-stage impeller system is an improvement for the following reasons. It is well known that the response of an impeller blade depends upon factors such as the blade's shape and pitch and particularly the velocity of the air striking the blade. Wind striking the impeller blade rotates the impeller by imparting a portion of its kinetic energy. The impeller is attached to a generator of electric power which charges the battery. When the wind velocity decreases or increases, a flap valve of a bypass unit is operated in response to a sensor, the flap valve changing position thereby causing the wind to be redirected to the low-speed impeller or the high-speed impeller chamber, respectively. Thus, the low-speed or the high-speed impeller chambers will operate at maximum efficiency throughout the forward movement of a vehicle.

Another improvement over current systems relates to an improved start-up/back-up air compressor. Various current systems provide an air compressor to pressurize an air accumulator. Upon start-up of the stationary vehicle, the air accumulator discharges pressurized air upstream of the impellers to create an initial air flow. The accumulator delivers sufficient air flow to the impellers to propel the vehicle forward until adequate airflow develops within the air duct of the forward moving vehicle. However, the presence of the accumulator poses a problem because its additional weight decreases the efficiency of the wind-powered system. The present system solves this problem by not incorporating the air accumulator. Instead, the present invention incorporates a start-up/back-up air compressor which discharges pressurized air to the top, rearward portion of the impeller so as not to obstruct the air flowing through the wind tunnel. Thus, by discharging pressurized air to rear of the impeller blade, the start-up/back-up air compressor has a direct impact on the system. Moreover, this mini-amp pressurized air compressor reduces excessive weight otherwise incurred with use of the air accumulator and also saves valuable space. Depending upon the specific design of the start-up/back-up air compressor, it may be connected to discharge air to the rear portion of the impellers of either the low-speed impellers or the high-speed impellers.

Another improvement over current systems relates to an improved air duct. Various current systems provide air ducts with axially-narrowing passages which decrease into venturi tubes. The narrow diameter of the venturi tube causes air passing therethrough to drop in pressure and increase in velocity. Increasing the air's velocity is desirable because it increases the air's kinetic energy for more efficient rotation of the impellers. The present invention improves upon the existing air ducts by incorporating a specially-shaped air scoop at the front portion of the air duct. This specially-shaped opening is simulative of a vortex, namely, a rotating, small mass of controlled and regulated air in the form of a spiral configuring to a partial vacuum. In addition to narrowing axially in a rearward direction, the air scoop wall has an aerodynamic, funnel shape for spiraling the incoming air passing through the air scoop. The spiraling of the air further increases the velocity of the air passing into the venturi wind tunnels at the rear of the air duct.

Additionally, it is preferable that heating coils circumscribe the air scoop or, as referred to herein, vortex. The heating coils heat the incoming air passing through the air scoop to further increase the energy and velocity of the air through thermodynamic function. The heating coils can increase or decrease the velocity of the air passing through the vortex and the wind tunnels by a thermostatic sensor located at the air scoop/vortex. This sensor is responsive to the power condition of the batteries. If the charging condition of the batteries are low, the heating coils will heat the system around the vortex and the wind tunnel thus increasing wind velocity. If the charging condition of the batteries are near full charge, the heating coils decrease in temperature or the heating coils will disengage completely. By increasing the velocity of the wind/air striking the impellers, even greater energy will be transferred to the impellers to power the generator. The vortex and wind tunnel may be proportionally conformed in size to any automobile regardless of its specific design, dimension, or fabrication.

Another improvement relates to the wind tunnel or channel extending from the rearward of the vortex to the beginning of the impeller activation housing. Existing wind-driven electricity generating devices accomplish this task inertly or with a system which gradually has a loss of air velocity through obstructions in the channel. The present innovation will be a straight channel or tube. The tube will have a "rifling" action by means of cut, spiral grooves on the interior of the wind tube/tunnel, through the span or distance. The "rifling" (as with a firearm) will transform and redirect the air current to substantially increase the forces striking the impeller by increasing the velocity of the air, thus, conferring more energy onto the impellers to generate electricity. Moreover, the wind tunnel includes a continuation of the heat coils from the vortex to further increase the velocity of the air/wind in the system as previously described.

Another improvement over existing wind-driven electricity generating systems is the front grill. The front grill will deter debris, fragments and other airborne elements from entering the air duct system itself. The grill will be heated by fine wires attached to the forward end of the grill. This will immediately begin to heat air passing through the air duct system to an increased velocity. The heated grill will also serve to deter ice and snow accumulation in colder climates.

Accordingly, it is a principal object of the invention to provide an improved wind-power system for generating electricity in a vehicle or the power consumption units.

It is another object of the invention to improve the efficiency of a wind-powered system by incorporating a multi-stage impeller arrangement.

It is a further object of the invention to provide an improved efficiency wind-powered system by incorporating a multi-stage impeller arrangement with a high-speed or low-speed impeller bypass.

Still another object of the invention is to provide an improved efficiency wind-powered system by incorporating a start-up/back-up air-compressor which does not use utilize an air accumulator.

Still another object of the invention is to provide an improved efficiency wind-powered system by incorporating air scoops, comparable to a vortex, which spiral the incoming air to increase the velocity thereof.

Still another object of the invention is to provide an improved efficiency wind-powered generator system by incorporating a heating means to increase the kinetic energy and therefor, the velocity of air passing through the air scoops/vortex and wind tube/tunnel or the air duct of the system.

Still another object of the invention is to provide an improved efficiency wind-powered system by incorporating a heated grill to initiate heating the air, to impede debris and fragments from the air conduit and act as a deterrent for snow and ice.

Still another object of the invention is to provide an improved efficiency wind-powered electric generator system by incorporating a rifling wind tunnel which will act as a continuation of the thermodynamic process in the air scoops/vortex.

Still another object of the invention is to provide an efficiency wind-powered electric generator system by incorporating three backups to the principal which is wind power, namely, 1) thermodynamic heating coils located in the vortex and wind tube; 2) a thermostat regulating the heating coils and the amount of heat provided to the air duct system; and 3) multi-stage impellers, including low-speed and high-speed impellers, responsive to a sensor; 4) a start-up or back-up air compressor to initiate impeller movement; and four back-ups which are regulated by a battery sensor which communicates the condition of one or more batteries.

Still another object of the invention is to provide a large, high velocity impeller at the front, by the front grill, or at the rear, by the muffler/exhaust, to push air or to pull out air in order to create a forward moving vehicle, whereby a high velocity draft is obtained from rotation of the impellers so as to generate electricity.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a system for generating electricity in a vehicle or a power consumption unit. The major components include an air duct, a multi-stage impeller system which drives an electric generator, and a battery for empowering the electric motor.

Figure 1:
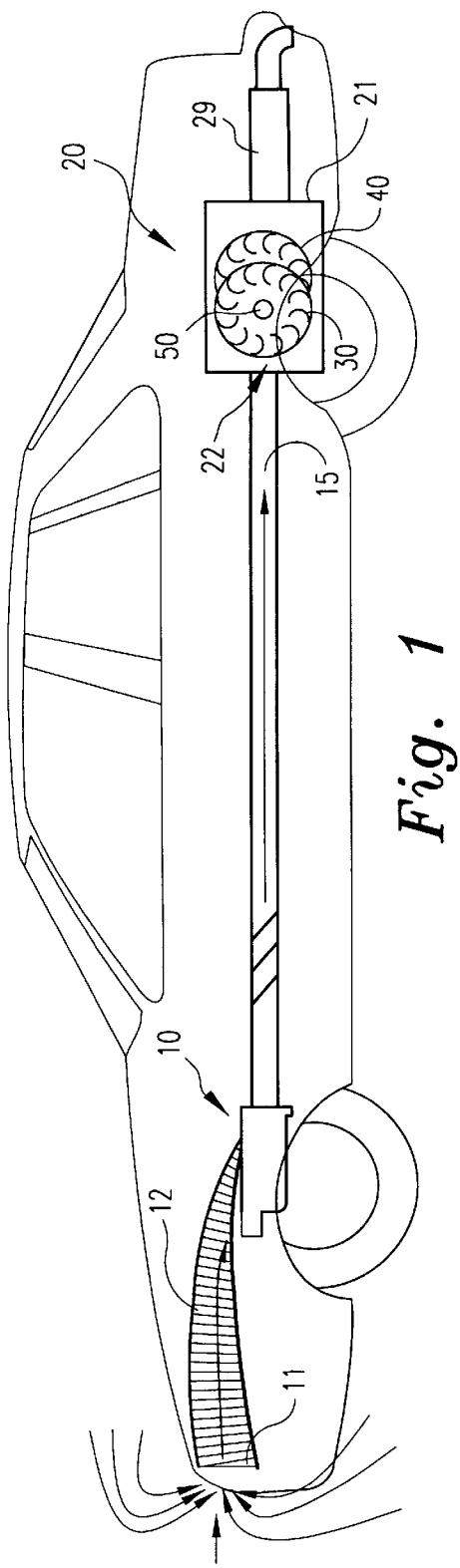
FIG. 1 is a side diagrammatic view of a wind-powered vehicle according to the present invention.
Figure 3:
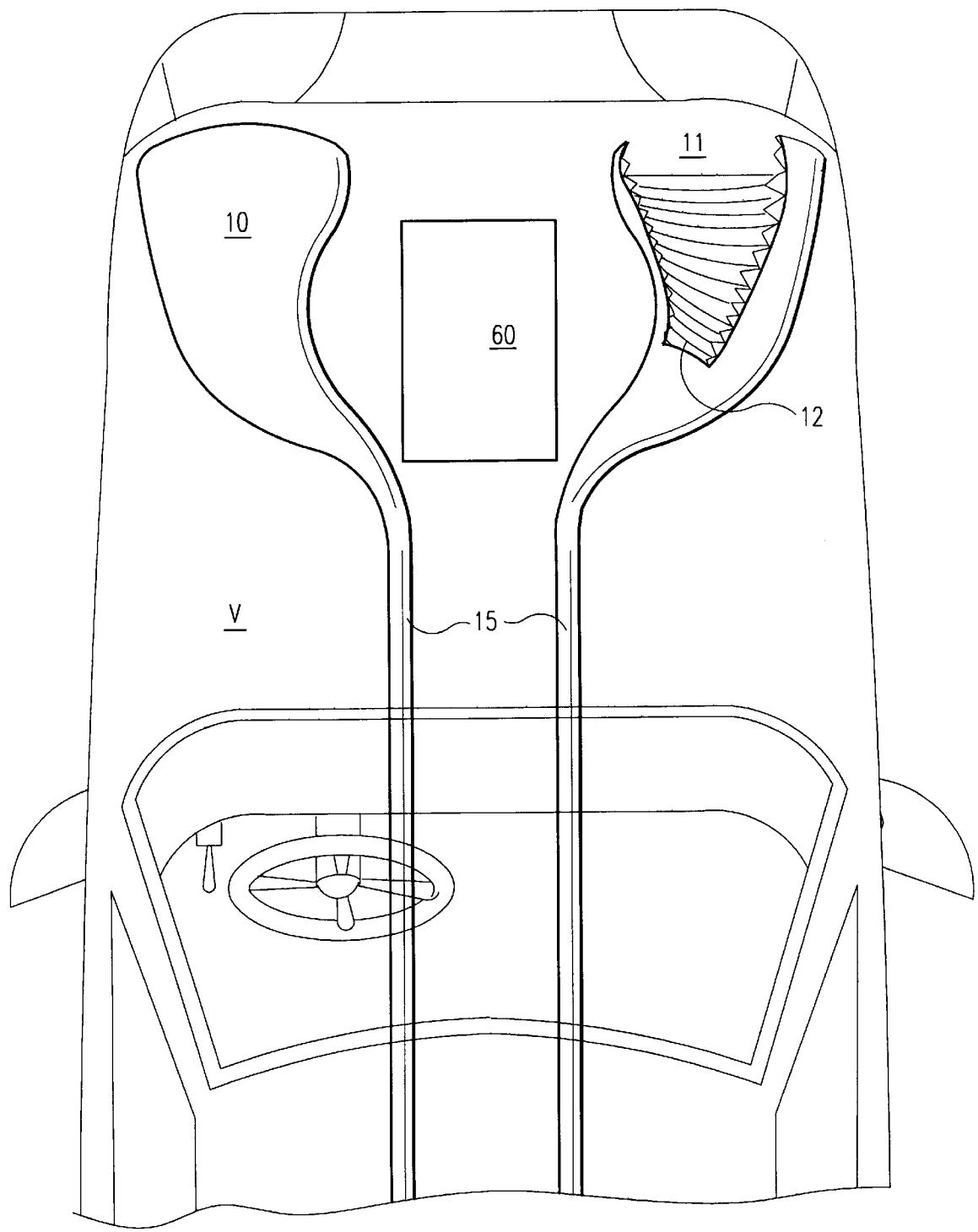
FIG. 3 is a top view of the wind-powered vehicle depicting a cutaway view of the air scoops/vortex.

FIG. 1 though FIG. 3 of the accompanying drawings depict the position and interconnection of the air-flow components disposed within a vehicle body V. Two air ducts 10 each have an inlet forming an air scoop/vortex 11 positioned at the front of the vehicle V for receiving air as the vehicle V moves forward, the air scoop/vortex 11 has an axially-narrowing passage 12 extending rearward. The walls of the axially-narrowing passage 12 are formed in an aerodynamic funnel-shape for spiraling the incoming air. Each air duct 10 has an outlet forming a wind tube/tunnel 15. The venturi wind/tube tunnel 15 is in communication with the air scoop/vortex 11.

Figure 4:
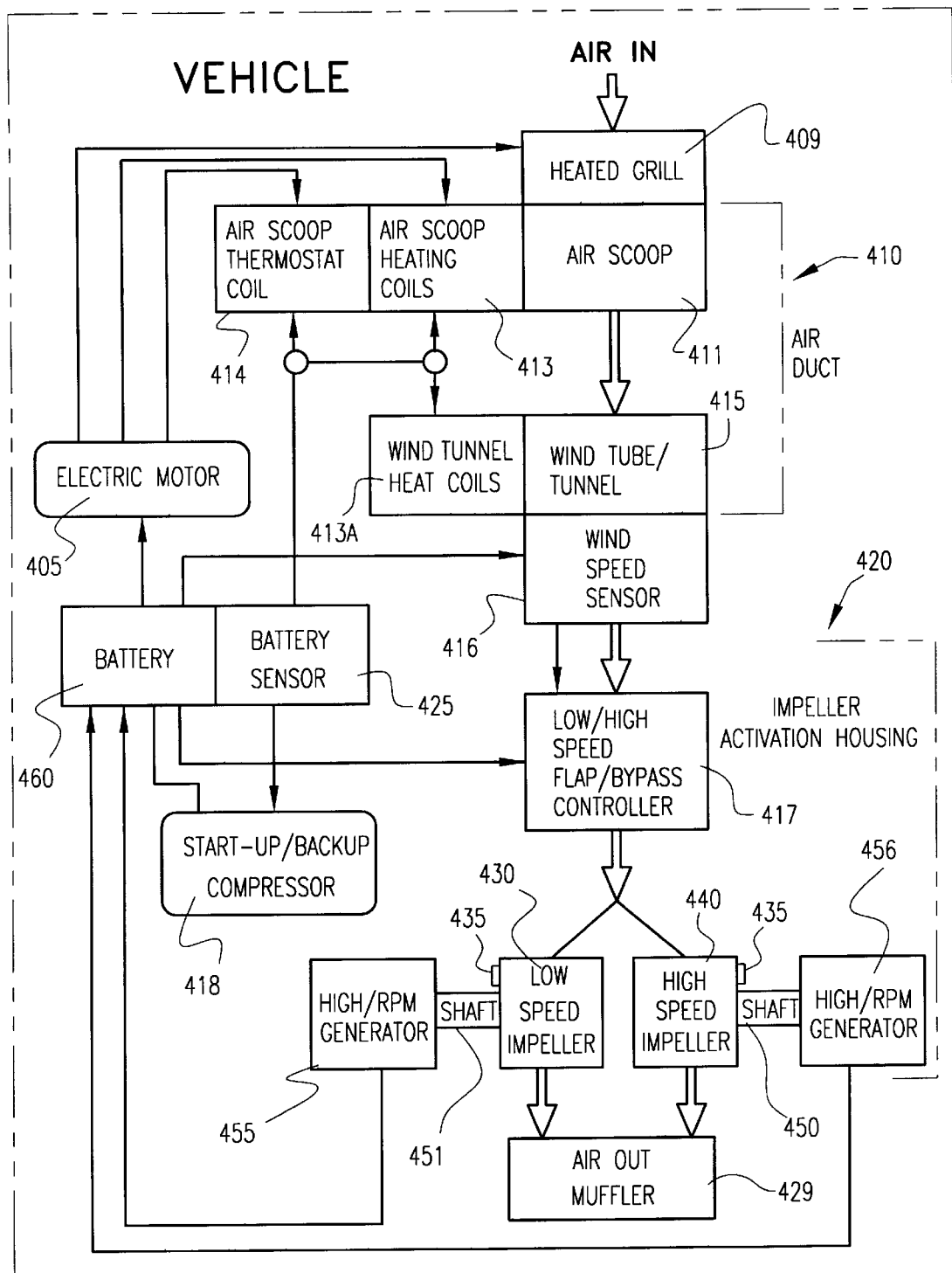
FIG. 4 is a diagrammatic view of the major components of the wind-powered vehicle according to the present invention.
Figure 5:
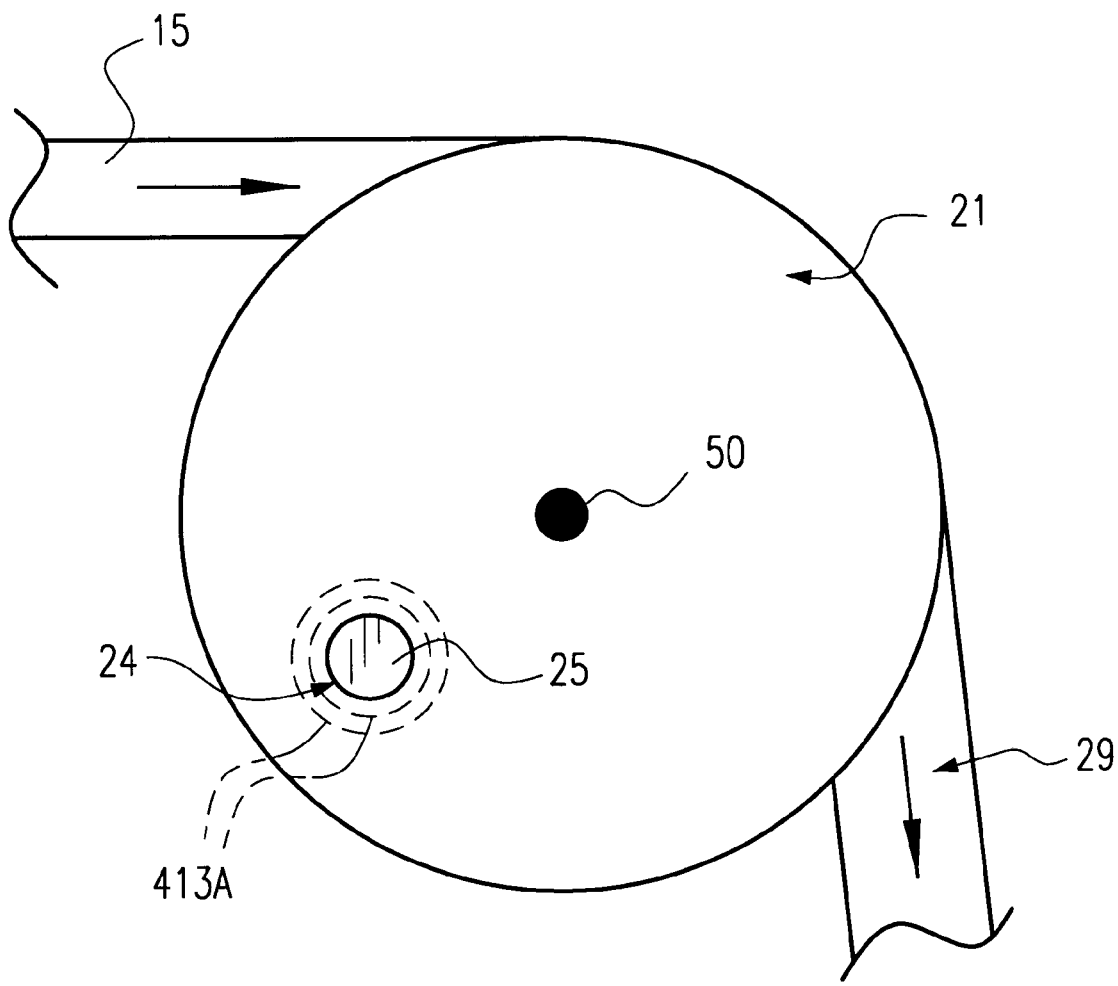
FIG. 5 is a diagrammatic side view of the impeller housing according to the present invention.

As shown in FIGS. 1 and 5, a multi-stage impeller system 20 is in communication with each of the wind tubes/tunnels 15 to receive velocitized air exiting therefrom. Each multi-stage impeller system 20 includes an impeller activation housing 21 having an activation housing passage 22, and an activation housing muffler 29. A high-speed impeller 30 is supported within the impeller activation housing 21 for rotation in response to high velocity air passing through the impeller activation housing 21. A low-speed impeller 40 is shown slightly offset behind the forward impeller for clarity of illustration in FIG. 1, but which is also supported within the impeller activation housing 21 in a parallel passage for rotation in response to low velocity air passing through the impeller activation housing 21. The high-speed impeller 30 and the low-speed impeller 40 are each connected to a different shaft 50 passing axially through an impeller 30,40, which rotate with the impeller 30,40, respectively, to drive an electric generator 455 and 456, respectively (shown diagrammatically in FIG. 4). Air leaving the low-speed impeller 40 or the high-speed impeller exits out of the activation housing muffler 29 to the atmosphere.

Furthermore, as seen in FIG. 5, the activation housing 21 includes a small circular hole 24 directed toward the impeller activation passage 22, located about 220°, and positioned in a direction directly facing the activation housing 21 on the exterior surface. The orifice 24 will be 1½ inches in diameter and have a flat hanging appendage or integument 25 to open or close the aperture. Thus the velocity of the impeller can be increased or decreased by opening or closing the orifice 24.

Furthermore, the area surrounding the orifice 24 is heated via heating coils (shown in FIG. 5, element 413A). Thus, a higher air speed will enter the impeller housing 21 to cause an increase in the impeller speed. The acceleration of the impeller by means of the air entering via the impeller housing is subsequently calibrated by a sensor. The battery 60, although shown in FIG. 3 located under the front hood (for illustrative purposes only), is preferably placed under the rear seat of the wind powered vehicle "V".

Figure 2:
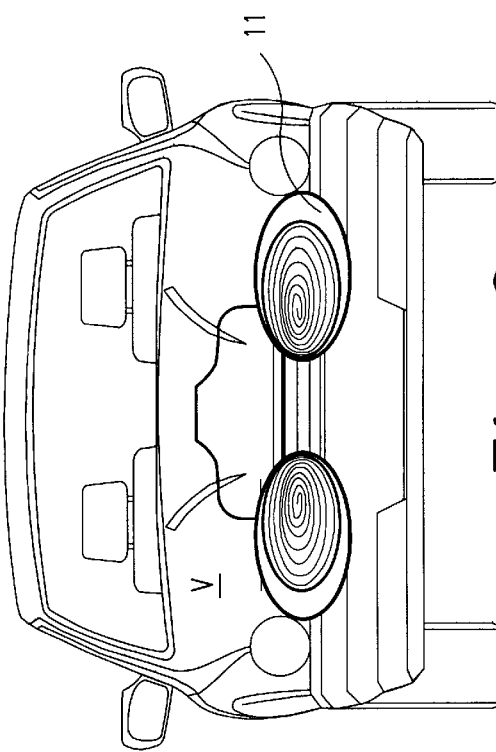
FIG. 2 is a front view of the wind-powered vehicle depicting the air scoops/vortex disposed in the vehicle grille.

FIG. 4 of the accompanying drawings is a diagrammatic view of the major components of the system for generating electricity in a wind-powered vehicle V according to the present invention. Each of the numbered blocks correspond with component parts of the embodiment showing a wind powered automobile as seen in FIGS. 1–3, by prefacing each numeral there shown with the digit "4". Air enters the air duct 410 through the heated grill 409 via the air scoop/vortex 411 which is positioned at the front of the vehicle "V" for receiving air as the vehicle moves forward. The air scoop/vortex 411 has an axially-narrowing passage extending rearward (not shown) to the wind tube/tunnel 415. Air scoop/vortex heating elements 413 are disposed surrounding the air scoops/vortex 411 and the wind tube/tunnel heating elements 413A (See FIG. 5). The elements 413A surround the wind tube/tunnel 415 to heat the air passing therethrough.

A wind speed sensor 416 is disposed at the rearward end of the wind tube/tunnel 415, just before the activation housing 420. The wind speed sensor 416 senses the wind velocity entering the activation housing 420 and sends an electric signal in sequence to 1) the high-speed impeller flap/bypass 417 or the low-speed impeller flap/bypass 419, 2) the air scoop and the wind tube/tunnel heating element 413, 413*a*, respectively 3) or the thermostat 414 for directing the air scoop 413 and wind tunnel 413*a* heat coils on a designed, measured basis. Air exiting the wind tube/tunnel 415 passes into the multi-stage activation housing 420.

Upon receipt of a predetermined signal from the wind speed sensor 416, the air passing through the wind tube/tunnel 415 will be selectively directed to the high-speed impeller 430 or the low-speed impeller 440 which are disposed in the multi-stage activation housing (20) upon separate shafts, including a high-speed impeller shaft 451 and a low-speed impeller shaft 450. Wind striking either the high-speed impeller 430 or the low-speed 440 causes rotation of the impellers 430, 440 and the shafts 450 and 451, respectively, therewith. One end of each shaft, 450 or 451, is connected to a generator, either the low-RPM generator 455 or the high-RPM generator 456, which generates an electric current in response to the rotation of the shaft 450 or 451 to power one or more batteries 460. The one or more batteries 460 provide electricity to the electric loads of the vehicle "V".

In a reciprocal fashion, each impeller within the impeller system 20 will have an orifice 435 which will increase or decrease the response of the impellers by either selective heat around the aperture or an integument over the aperture, opening or closing depending on the action of the sensor.

The one or more batteries 460 power 1) the wind speed sensor 416, 2) the battery sensor 425 for monitoring electric charge (amperage), 3) the electric grill 409 which initially heats the air coming into the system, 4) the controller of the low-speed impeller flap/bypass 417, 5) the controller of the high-speed impeller flap/bypass 419, 6) the air scoop and wind tube/tunnel heating coils 413,414, 7) the start-up/back-up mini-amp air compressor 418, and 8) the electric motor 421 which imparts to the vehicle forward or backward motion.

A signal from the battery sensor unit 425, set at a predetermined electric charge (amperage), selectively activates or deactivates the air scoop heating coils 413 and/or the wind tube/tunnel heat coils 413*a*, the start-up/back-up mini-amp air compressor 418. Upon activation, the start-up/back-up mini-amp air compressor 418 directs compressed air to the top, rearward section of the activation housing 420, just before the muffler 29. The start-up/back-up mini-amp air compressor 418 may be designed to discharge compressed air either towards the blades to form a clockwise motion on the low-speed impeller 440 or the high-speed impeller 430.

It is to be understood that the present invention is not limited to the sole embodiment described above, but encompasses any and all embodiments within the scope of the following claims.

I claim:

1. A system for generating electricity comprising:

an air duct disposed within a body, the air duct having an inlet forming an air scoop positioned at the front of the body for receiving air, the air scoop having an axially-narrowing passage, extending rearward, and the air duct having a wind tube in a medial portion of a vehicle in communication with the air scoop and an outlet to the rear of the vehicle in communication with the air scoop, wherein the air scoop further comprises an aerodynamic, axially-narrowing funnel-shaped wall-receptacle for spiraling the incoming air to further increase the velocity of the air passing into the wind tube;

a multi-stage impeller system comprising an activation housing having a housing inlet in communication with the wind tube, a housing muffler, a housing passage extending from the housing inlet rearward through the impeller housing to the housing muffler, a high-speed impeller supported within the impeller housing for rotation in response to high velocity air passing through the impeller housing, a low-speed impeller supported within the impeller housing for rotation in response to low velocity air passing through the impeller housing, and means for converting the kinetic energy of the rotating impellers into electricity by means of mechanical energy; and at least one battery disposed within the vehicle, each of the at least one battery electrically connected to, and for charging by, the means for converting the mechanical energy into electricity.

2. The system for generating electricity according to claim 1, wherein the means for converting the mechanical energy of the rotating impellers into electricity comprises a first generator driven by the high-speed impeller and a second generator driven by the low-speed impeller.

3. The system for generating electricity according to claim 1, wherein:

the high-speed impeller is disposed within the impeller activation housing and the low-speed impeller is located adjacent to the high-speed impeller; and the means for converting the mechanical energy of the rotating impellers into electricity comprises two (2) separate generators driven by the high-speed impeller and the low-speed impeller.

4. The system for generating electricity according to claim 3, further including an orifice disposed within a side of the impeller activation housing subject to adjustment by an integument which increases the velocity of air around the impellers, said orifice further being controlled by a sensor.

5. The system for generating electricity according to claim 3, further including an orifice disposed within a side of the impeller activation housing subject to adjustment by an integument which decreases the velocity of air around the impellers, said orifice further being controlled by a sensor.

6. The system for generating electricity according to claim 3, further comprising a bypass inlet for the high-speed impeller or the low-speed impeller which both impellers comprise the following:

a high-speed bypass line having a passage to communicate air from the wind tube to the high-speed impeller and a low-speed impeller bypass having a passage to communicate air from the wind tube to the low-speed impeller;

a bypass controller for selectively directing air to one of either the high-speed impeller or the low-speed impeller; and a impeller bypass wind speed sensor disposed to detect the velocity of the air passing through the wind tube, the impeller bypass wind speed sensor electrically connected to the bypass controller to send an electric signal thereto.

7. The system for generating electricity according to claim 1, further comprising a start-up air compressor, the start-up air compressor comprising:

means for delivering compressed air to the inlet of one of either the high-speed impeller or the low-speed impeller;

a control unit for activating and de-activating the means for delivering compressed air upon receipt of an electrical signal;

a rotational speed sensor disposed to detect the air velocity on the low-speed and high-speed impellers, the rotational speed sensor electrically connected to the start-up air compressor to send an electric signal to the control unit;

at least one amperage sensor to detect when the at least one battery necessitate charging when all other systems are unsuccessful, the at least one amperage sensor is electrically connected to the at least one battery, the at least one amperage sensor is electrically connected to the start-up air compressor to send an electric signal to the control unit; and wherein the start-up air compressor is electrically connected to the at least one battery to receive electrical power therefrom.

8. The system for generating electricity according to claim 3, further comprising:

a high-speed impeller and low-speed impeller disposed adjacent to one another to communicate air from the wind tube;

a bypass controller for selectively directing air to either the high-speed impeller or the low-speed impeller housing;

at least one heated grill to initially increase the temperature of the air entering the air duct composed of fine wire and selectively controlled electronically through a sensor to the outside environment, each of the at least one heated grill deters debris and fragments and melt ice and snow, each heated grill is electronically connected to one of the at least one battery to receive electrical power therefrom;

a start-up air compressor further comprising means for delivering compressed air to the top, rearward section of one of either the high-speed impeller or the low-speed impeller, a control unit for activating or de-activating the means for delivering compressed air upon receipt of an electrical signal, the start-up air compressor electrically connected to the at least one amperage sensor to receive amperage data and sending a corresponding electrical impulse, the start-up air compressor is electrically connected to the at least one battery to receive electrical power therefrom;

a wind speed sensor disposed to detect the velocity of the air passing through the wind tube, (1) the wind speed sensor electrically connected to a thermodynamic portion of the air scoop and wind tube to send an electric signal to the control unit, (2) the wind speed sensor also electrically connected to the bypass controller for low and high speed impeller housing, and (3) the wind speed sensor electrically connected to the start-up air compressor to send an electric signal to the control unit;

the wind tube communicating from the rearward end of the air scoop to the opening of the impeller activation housing, the wind tube establishes a straight, narrow channel for air to be contained and directed to the impeller activation housing, the wind tube having a rifling effect so as not to disturb air flow, the wind tube in conjunction with air scoop surrounds the air with heating coils, further, increasing the air velocity through thermodynamics.

9. The system for generating electricity according to claim 1, further comprising:

air heating means for heating incoming air passing through the air scoop to increase the energy and velocity of the air.

10. The system for generating electricity according to claim 9, wherein the air heating means comprises helical heating coils and are thermostatically controlled by the outside environment, the air scoop and wind tube heat coils are thermostatically controlled by at least one sensor via the onset of the impeller activation housing, the air scoop and wind tube are in rectification or communication with the at least one sensor in that the at least one sensor may require more amperage or less amperage.

11. The system for generation of electricity according to claim 9, wherein the air heating means comprises heating coils communicating with the air scoop and the wind tube.

12. The system for generating electricity according to claim 1, wherein the air is pushed into the air duct through the front grill by a large, high velocity impeller whereby at least one impeller rotates within the impeller activation housing.

13. The system for generating electricity according to claim 1, wherein the air is pulled out of the air duct system via the muffler by a large, high velocity impeller whereby at least one impeller rotates within the impeller activation housing.

14. A system for generating electricity comprising:

an air duct disposed within a body, the air duct having an inlet forming an air scoop positioned at the front of the body for receiving air, the air scoop having an axially-narrowing passage, extending rearward, and the air duct having a wind tube in a medial portion of a vehicle in communication with the air scoop and an outlet to the rear of the vehicle in communication with the air scoop;

a multi-stage impeller system comprising an activation housing having a housing inlet in communication with the wind tube, a housing muffler, a housing passage extending from the housing inlet rearward through the impeller housing to the housing muffler, a high-speed impeller supported within the impeller housing for rotation in response to high velocity air passing through the impeller housing, a low-speed impeller supported within the impeller housing for rotation in response to low velocity air passing through the impeller housing, and means for converting the kinetic energy of the rotating impellers into electricity by means of mechanical energy; and at least one battery disposed within the vehicle, each of the at least one battery electrically connected to, and for charging by, the means for converting the mechanical energy into electricity;

the air is pushed into the air duct through the front grill by a large, high velocity impeller whereby at least one impeller rotates within the impeller activation housing.

15. The system for generating electricity according to claim 14, wherein the air scoop further comprises an aerodynamic, axially-narrowing funnel-shaped wall-receptacle for spiraling the incoming air to further increase the velocity of the air passing into the wind tube.

16. A system for generating electricity comprising:

an air duct disposed within a body, the air duct having an inlet forming an air scoop positioned at the front of the body for receiving air, the air scoop having an axially-narrowing passage, extending rearward, and the air duct having a wind tube in a medial portion of a vehicle in communication with the air scoop and an outlet to the rear of the vehicle in communication with the air scoop;

a multi-stage impeller system comprising an activation housing having a housing inlet in communication with the wind tube, a housing muffler, a housing passage extending from the housing inlet rearward through the impeller housing to the housing muffler, a high-speed impeller supported within the impeller housing for rotation in response to high velocity air passing through the impeller housing, a low-speed impeller supported within the impeller housing for rotation in response to low velocity air passing through the impeller housing, and means for converting the kinetic energy of the rotating impellers into electricity by means of mechanical energy; and at least one battery disposed within the vehicle, each of the at least one battery electrically connected to, and for charging by, the means for converting the mechanical energy into electricity;

the air is pulled out of the air duct system via the muffler by a large, high velocity impeller whereby at least one impeller rotates within the impeller activation housing.

* * * * *